United States Patent
Köhler et al.

(10) Patent No.: US 11,344,035 B2
(45) Date of Patent: May 31, 2022

(54) SUSPENSION APPARATUS FOR TRANSPORTING AND SPREADING AT LEAST ONE SAUSAGE STRING AND A METHOD

(71) Applicant: VEMAG MASCHINENBAU GMBH, Verden (DE)

(72) Inventors: Sven Köhler, Verden (DE); Klaus Hiller, Dorverden (DE)

(73) Assignee: Vemag Maschinenbau GmbH, Verden (DE)

( * ) Notice: Subject to any disclaimer, the term of this patent is extended or adjusted under 35 U.S.C. 154(b) by 0 days.

(21) Appl. No.: 17/021,515

(22) Filed: Sep. 15, 2020

(65) Prior Publication Data
US 2021/0076691 A1   Mar. 18, 2021

(30) Foreign Application Priority Data
Sep. 17, 2019   (DE) .................... 202019105153.1 U

(51) Int. Cl.
*A22C 15/00* (2006.01)
(52) U.S. Cl.
CPC ................. *A22C 15/001* (2013.01)
(58) Field of Classification Search
CPC ...... A22C 15/00; A22C 15/001; A22C 15/007
USPC ......................................... 452/51
See application file for complete search history.

(56) References Cited

U.S. PATENT DOCUMENTS

| | | | |
|---|---|---|---|
| 5,067,620 A | 11/1991 | Norrie | |
| 5,354,229 A * | 10/1994 | Markwardt | A22C 15/00 452/186 |
| 7,160,184 B1 * | 1/2007 | Lebsack | A22C 15/001 452/177 |
| 2007/0093192 A1 * | 4/2007 | Lebsack | A22C 15/002 452/51 |

(Continued)

FOREIGN PATENT DOCUMENTS

| | | |
|---|---|---|
| DE | 4122370 A1 | 1/1993 |
| EP | 1915910 A1 | 4/2008 |

(Continued)

OTHER PUBLICATIONS

European Patent Office, extended European Search Report issued in European patent application No. 20191582.4. dated Nov. 3, 2020.

(Continued)

*Primary Examiner* — Richard T Price, Jr.
(74) *Attorney, Agent, or Firm* — Thompson Hine LLP

(57) ABSTRACT

The present invention concerns a suspension apparatus (1) for hanging up and transporting at least one sausage string (2) including a transport device (6) for transporting the at least one sausage string (2), that has at least one carrier hook (8) for carrying the sausage string (2), the hook being movable along a path of movement (10) by means of a guide and drive device. The apparatus further includes a spreading device (14) arranged stationarily relative to the transport device (6) for spreading the sausage string (2). The spreading device has at least one spreading element (16) which is arranged adjacent to the path of movement (10) of the carrier hook (8) and which in operation acts on the sausage string (2) carried by the carrier hook (8) in such a way that the sausage string (2) is spread.

20 Claims, 7 Drawing Sheets

(56) References Cited

U.S. PATENT DOCUMENTS

| | | | |
|---|---|---|---|
| 2010/0243409 A1* | 9/2010 | Borkiewicz | A22C 15/001 |
| | | | 198/465.4 |
| 2012/0231714 A1 | 9/2012 | Krompholz et al. | |
| 2012/0252332 A1* | 10/2012 | Maddux | A22C 11/107 |
| | | | 452/30 |
| 2021/0076691 A1* | 3/2021 | Kohler | A22C 15/001 |

FOREIGN PATENT DOCUMENTS

| | | |
|---|---|---|
| EP | 2497367 A2 | 9/2012 |
| EP | 2786661 A1 | 10/2014 |

OTHER PUBLICATIONS

The German Patent and Trade Mark Office, Search Report issued in Application No. 20 2019 105 153.1 dated Mar. 18, 2020.
European Patent Office, Office Action and Opinion issued in European patent application No. 20191582.4, dated Dec. 16, 2021, 7 pages.

* cited by examiner

SUSPENSION APPARATUS FOR TRANSPORTING AND SPREADING AT LEAST ONE SAUSAGE STRING AND A METHOD

BACKGROUND

The invention concerns a suspension apparatus for hanging up and transporting at least one sausage string including a transport device for transporting the at least one sausage string, that has at least one carrier hook for carrying the sausage string, that is movable along a path of movement by means of a guide and drive device.

The invention further concerns a method of spreading at least one sausage string by means of a suspension apparatus according to the invention.

In the production of sausages individual sausages are produced by twisting off a filled sausage casing. The pairs of sausages or sausage strings produced in that way are passed to a suspension machine in the course of the further production procedure. In that situation the constriction locations produced by twisting of the casing are engaged by carrier hooks so that a respective pair of sausages or a sausage string is positioned on each carrier hook. In accordance with the invention the term sausage string is used to denote at least two sausages which are strung together, therefore a pair of sausages, or also a large number of sausages which are strung together; the term sausage string is used hereinafter for those different situations. A group of suspended sausage strings is then generally transferred to a so-called smoke stick. For that purpose the smoke stick is threaded in between the sausage strings.

To simplify the operation of threading in the smoke stick and in particular also to reduce the time required for that and to avoid damage to the product a certain spreading of the sausage strings is advantageous. For, the greater the spreading of the sausage strings on the suspension machine, the easier it is to insert the smoke stick.

Usually a spreading action on the carrier hook is achieved directly. The sausage strings upon being hung on the hooks are spread directly beneath the twisted constriction location by means of a special geometry, generally a kind of roof-shaped geometry, of the carrier hook or a throat configuration in the carrier hook.

By virtue of the hook throat configuration which is increased in width as a result it is difficult to find the constriction locations in accurately positioned relationship when transferring the sausage strings to the suspension machine. In particular sausages of small diameter or under-filled sausages in the string usually hang down very closely, without any appreciable spreading relative to each other. In order to achieve the required spreading effect even with such strings a large and correspondingly wide hook throat configuration would be necessary. Such large carrier hooks correspondingly require more space in order to be able to transfer the sausage strings from the carrier hooks on to the smoke stick. That would result in a smaller number of carrier hooks per unite of length and accordingly a smaller number of sausage strings for each smoke stick.

In addition, discontinuously operating systems for spreading sausage strings are known. A movable external spreading apparatus is introduced between the sausage strings and then moved apart to achieve the spreading action. The disadvantage of such a system is that the production process would have to be interrupted. Furthermore a certain pre-spreading of the sausage strings is required for that purpose to introduce the spreading device between the sausage strings.

SUMMARY

The object of the invention is to at least partially alleviate the above-mentioned disadvantages and to provide a suspension apparatus or machine and a corresponding method which reliably achieve adequate spreading of sausage strings in operation, in particular for reliably inserting a smoke stick.

The object of the invention is attained with a suspension apparatus having the features of claim 1 and optionally the appendant claims.

In a first aspect the object of the invention is attained by a suspension apparatus of the kind set forth in the opening part of this specification, which has a spreading device arranged stationarily relative to the transport device for spreading the sausage string, that has at least one spreading element which is arranged adjacent to the path of movement of the carrier hook and which in operation acts on the sausage string carried by the carrier hook that the sausage string is spread.

The spreading device which is arranged stationarily according to the invention has the advantage that spreading of the sausages or a sausage string can be effected reliably at any time even during production operation, using relatively simple means. The ongoing production process does not have to be interrupted. Thus the sausage strings carried by the carrier hooks can be spread upon being transported along the path of movement of the transport device. The movement of the hanging sausage strings is used to achieve the required spreading effect. The carrier hooks advantageously do not need to be of a special configuration in regard to spreading sausages. The spreading device is preferably mounted to a machine frame structure and is thus arranged stationarily. It can be positioned at different locations on the machine frame structure and can possibly be adjustable, but in operation the spreading device is substantially stationary and immobile while the sausage string is moved relative to the spreading device.

In a preferred embodiment the guide and drive device for the carrier hook is so designed that the path of movement thereof is at least portion-wise curved and in particular extends along an arcuate portion, wherein the spreading device is arranged at least partially in the region of the arcuate portion, in particular adjoining an end of the arcuate portion, for guiding the sausage string on to the spreading device. The force of gravity on the suspended sausage string causes a gap between a first end of the sausage string and a second end thereof, the gap extending substantially perpendicularly beneath the carrier hooks, in particular beneath the hook throat configuration thereof. The gap is delimited in its vertical direction at its upper end by the throat configuration of the hook and is open at its lower end. By definition the gap can assume different shapes depending on the kind and geometry of the respective sausages. Hanging sausage strings which are transported along a curved path of movement, in particular an arcuate portion, are exposed to centrifugal forces. By virtue of the centrifugal forces the gap is deflected in a direction outside the arcuate portion in an angle about the tangent to the arcuate portion. Guidance of the gap on to the spreading elements can be improved by means of an arrangement of the spreading device in the transport direction to an end of the arcuate portion.

In a further aspect of the invention the object of the invention is attained or the suspension apparatus according to the invention is advantageously further developed in that disposed in the region of the curved portion, in particular the arcuate portion, in particular vertically below the transport device, is a catch element or plate which in operation prevents at least one sausage or a part of the sausage string from being deflected by virtue of centrifugal forces. That advantageously provides that in particular a part of the sausage string, which is hanging inwardly within the arcuate portion, is prevented from being deflected outwardly by centrifugal forces which occur because of the curved path of movement. Consequently spreading of the sausage string already begins as the part of the sausage string, hanging on the outside, is deflected by virtue of the centrifugal forces. Consequently this also provides a particularly preferred positive co-operation with a spreading device according to the invention.

It is preferred that the catch element and the transport device co-operate in such a way that a vertical spacing between the catch element and the transport device is set, wherein the vertical spacing is so selected that a first free end of a sausage string in a transport direction along the path of movement, in particular a sausage hanging inwardly within the arcuate portion, of a sausage string is at least portion-wise in frictional or positively locking connection to the catch element, and a second free end of a sausage string is freely movable in the transport direction along the path of movement, in particular a sausage hanging outwardly within the arcuate portion of a sausage string. The catch element or plate according to the invention optimizes guidance of the gap which extends between the sausage strings on to the spreading device. Temporarily checking the movement of a free end of a sausage string by means of the catch element means that the gap geometry changes portion-wise from a substantially bar-shaped gap geometry to a gap geometry which is enlarged in a V-shape. Spreading of the sausage string is therefore effected indirectly by way of the influence of the movement forces acting on the string. That reproducibly improves guidance of the gap on to a first spreading element.

In a further preferred embodiment the spreading device is arranged substantially beneath the path of movement of the carrier hook. A spreading device arranged beneath the hanging sausage string has the advantage that the spreading device is set up independently of the length of the string and the type of sausages. By virtue of the force of gravity acting on the suspended sausage strings the gap correspondingly extends beneath the carrier hooks, in particular substantially perpendicularly beneath the throat configuration of the hooks.

Particularly preferably the at least one spreading element is at least partially curved. The gap in the sausage string, that moves along the path of movement upon transport, is guided in a direction towards the spreading device, in particular the spreading elements, for increasing the gap width, that is to say for spreading the sausage string. Depending on the respective arrangement and form of the spreading elements the gap geometry can thus be influenced during transport of the sausage strings. A curved spreading element has the advantage that spreading can be effected by way of a defined curvature of the spreading elements, whereby the gap geometry and in particular the gap width can be determined relative to the path of movement. In particular the spreading action of the spreading elements can be influenced and optimised by a variation in the position of the spreading elements within the gap between the sausage strings. The position of the spreading elements within the gap can be altered by means of a curved configuration of the spreading elements.

According to a preferred development the spreading device includes a plurality of bar-shaped or rail-shaped spreading elements, wherein a first spreading element is arranged by means of a connecting element in a transport direction before a second and a third spreading element, wherein the first spreading element is arranged at least portion-wise parallel to the path of movement. By virtue of their simple structure bar-shaped, rod-shaped or rail-shaped spreading elements can be inexpensively integrated into conventional systems. A further advantage is afforded in particular for bar-shaped or rod-shaped spreading elements, by virtue of the simple geometry thereof, whereby the spreading elements are easy to clean. Easy cleaning of apparatus or machine components is essential in particular in the foodstuffs industry. Besides simple cleaning of the individual elements simple cleaning of the entire apparatus is also important. Three in particular bar-shaped or rod-shaped spreading elements arranged against each other meet that criterion by virtue of their simple geometrical arrangement.

Preferably at least two spreading elements are arranged at least portion-wise in mutually spaced relationship, wherein the spacing increases at least portion-wise in the transport direction in a transverse direction extending horizontally and orthogonally to the transport direction. Two spreading elements which are arranged relatively spaced in the transverse direction at least portion-wise cause spreading of the sausage string. An increase in the transport direction of the spacing of the spreading elements permits spreading of the sausage string, in dependence on the distance travelled, along the path of movement. That can be advantageous for different sausage thicknesses or a differing number of sausage strings along the path of movement.

Further preferably the spacing of the spreading elements is at least portion-wise adjustable in the transverse direction. A variable spacing of the spreading elements in the transverse direction is advantageous for different sausage geometries. By way of example long thin sausages of a string and/or long sausage strings require greater spreading for introduction of a smoke stick than small thick sausages of a string and/or short sausage strings. A minimum spacing of the spreading elements at the position at which a smoke stick is to be introduced into the spread sausage strings or at which the spread sausage strings are to be guided on to the smoke stick is defined by way of a width of the smoke stick. The spacing of the spreading elements in the transverse direction is at least portion-wise greater than the width of the smoke stick.

It is further preferred that the cross-sectional areas of the spreading elements are substantially round or substantially form a polygon, in particular a rectangle or a triangle, wherein in particular one or more free ends of the spreading elements terminate with an end element in the form of a point or a hemisphere. The cross-sectional areas of the spreading elements also have an influence on optimized spreading of the sausage strings. It is important that the sausages in a string are not damaged in the production process. With the suspension apparatus according to the invention the sausage strings are guided along the spreading elements, with frictional forces thus occurring between the sausages and the spreading elements. It is accordingly appropriate, depending on the respective kind and geometry of sausage, to provide a suitable cross-sectional area for the spreading elements in order in that way to optimize the contact surface between the sausages and the spreading elements.

In a further preferred embodiment the spreading device is spaced at least portion-wise vertically relative to the carrier hook, wherein the vertical spacing is variably adjustable, preferably in a range between 0 mm and 300 mm, particularly preferably in a range of 10 mm through 100 mm. Flexible use of a suspension apparatus according to the invention with the spreading device is required to be able to meet different customer demands. In other words, depending on the respective sausage geometry and/or sausage string length, a differing spreading action is required for optimized introduction of a smoke stick. The vertical spacing of the spreading device relative to the carrier hooks is an important parameter for influencing the spreading action for that purpose.

In a further preferred embodiment the guide and drive device for the carrier hook is so designed that the path of movement thereof at least portion-wise has a difference in height with a first height level and a second height level, wherein preferably the spacing between the first height level to the second height level is in a range between 50 mm and 500 mm, particularly preferably in a range of 50 mm through 20 mm. The sausage strings are preferably guided at a gap position just below the throat of the hook on to a first spreading element as it is at that position that present invention-spreading of the sausage string is at its greatest. In addition the freedom of movement for the sausage string is slight at that gap position, by virtue of the proximity to being suspended on the hook throat. A small freedom of movement leads to close tolerances which are advantageous for a stable production process. To achieve an optimized spreading action it is desirable for the spreading elements then to be passed to a position in the central region of the gap. In the embodiment according to the invention that is achieved in a simple way by transferring the path of movement to a second height level. In addition the height level of the spreading device is also adjustable with a first and a second height level. That therefore affords a number of variables for adjusting the vertical spacing between the hook throats and the spreading device.

It is further preferred that at least a part of the spreading device is adjustable in a transport direction and can be fixed in various positions. Different movement forces act on the sausage string depending on the respective kind and geometry of the sausages. For optimum guidance of the gap of the sausage string on to the spreading device along the path of movement precise positional setting in the horizontal and vertical directions is important for achieving an optimized spreading action.

It is further preferred that the spreading device co-operates with a smoke stick guide device for guiding a smoke stick, the smoke stick guide device being arranged adjacent to the spreading device. A smoke stick guide device for guiding a smoke stick is advantageous, in particular when using long smoke sticks, to be able to introduce the smoke stick in specifically targeted relationship at the gap position of the sausage strings with maximum spread. Accordingly it is provided according to the invention that the position of the smoke stick guide device for the smoke stick can be adapted depending on the respective setting of the spacings in the horizontal and vertical directions of the spreading elements of the spreading device.

Preferably the spreading device is coupled to a feed conveyor device for automatically feeding a smoke stick into the spreading device, in particular along the smoke stick guide device. To save on time and personnel an automatic feed conveyor device can be coupled to the spreading device for feeding a smoke stick.

According to a further aspect of the invention the above-stated object is attained by a method of spreading at least one sausage string by means of a suspension apparatus according to the invention.

In regard to the advantages of the method according to the invention and the embodiments thereof attention is directed to the foregoing description of the spreading apparatus according to the invention.

BRIEF DESCRIPTION OF THE DRAWINGS

The invention is described hereinafter by means of a preferred embodiment by way of example of a suspension apparatus and a method with reference to the accompanying Figures in which.

DETAILED DESCRIPTION

Figure 1:
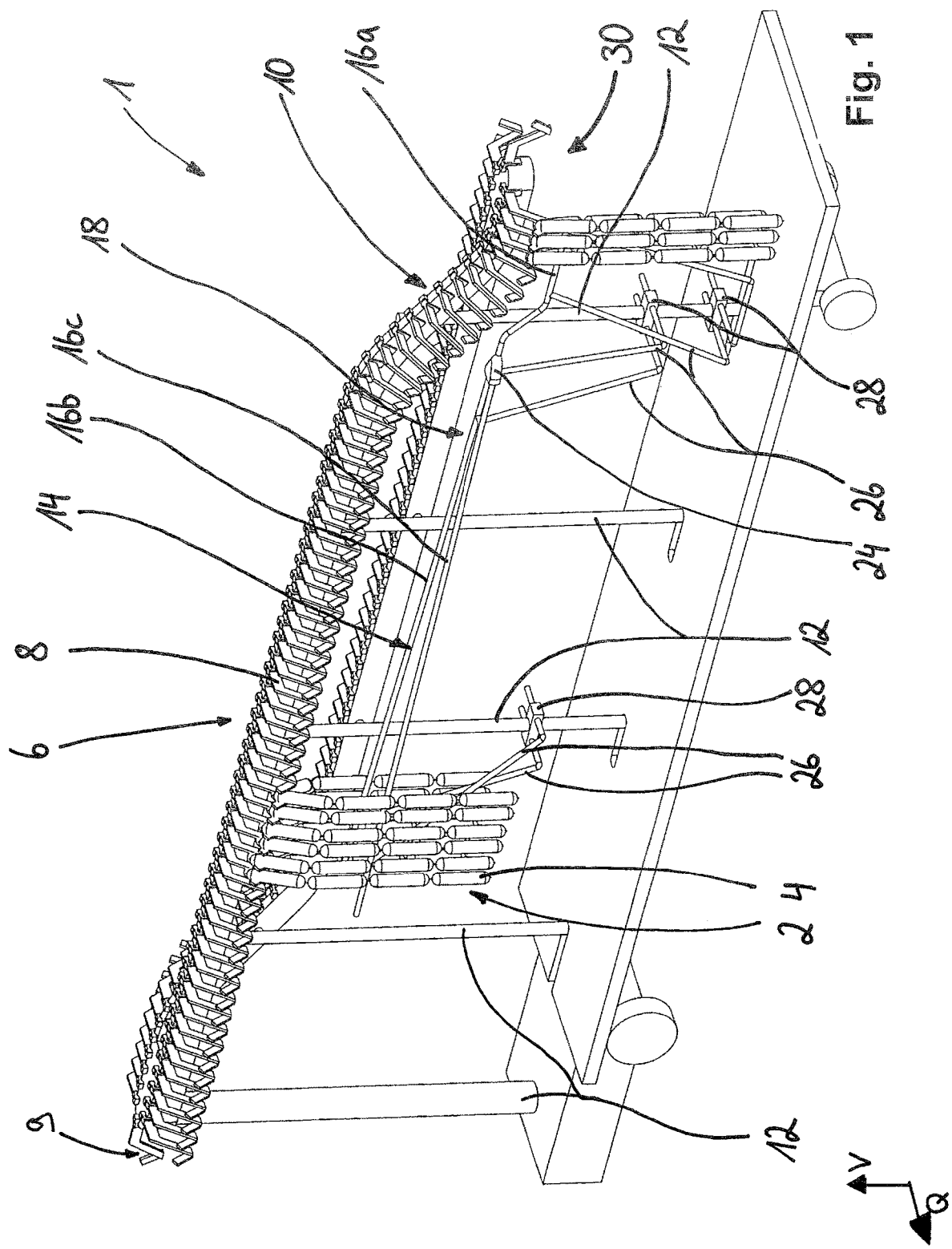
FIG. 1 shows a perspective view of a suspension apparatus.
Figure 2:
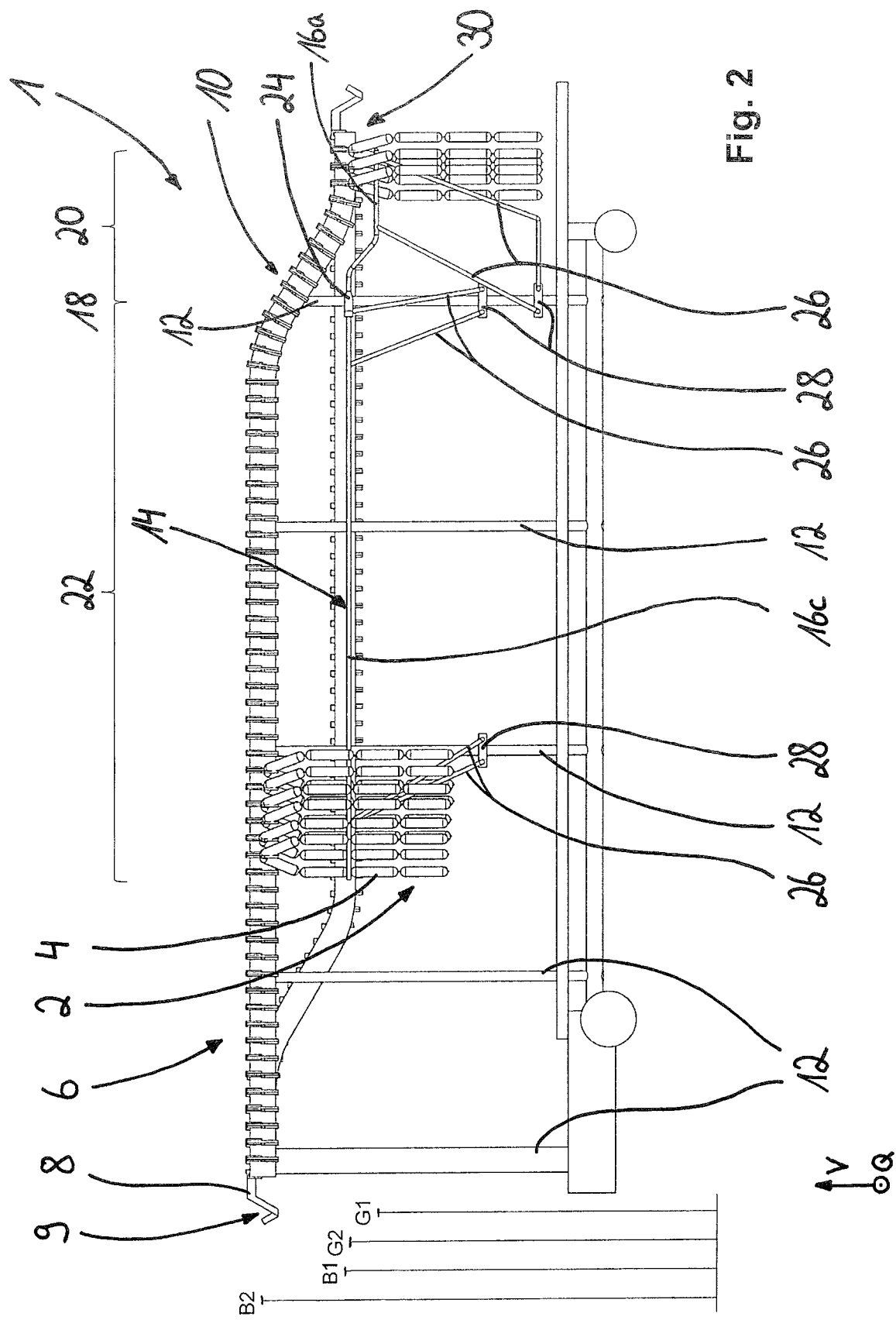
FIG. 2 shows a side view of the suspension apparatus.

FIG. 1 shows a suspension apparatus or machine 1 according to the invention for transporting a large number of sausage strings 2. For transport purposes the suspension apparatus 1 has a transport device 6 which is arranged on a machine frame structure and which is equipped with a multiplicity of carrier hooks 8. The carrier hooks 8 are movable along a path of movement 10 by means of the transport device 6 having a drive, they are fixed for example to a circulating chain or a belt or band movable by the drive and are movable along a guided path of movement 10. In the embodiment according to the invention the path of movement 10 of the transport device 6 forms a closed circuit. Other forms of the path of movement 10 can also be considered as being in accordance with the invention, including also paths of movement 10 which do not form a closed circuit. The carrier hooks 8 are arranged at a mutual spacing in the transport direction along the path of movement 10. The carrier hooks 8 have a hook throat 9. The hook throat 9 is adapted to receive a sausage string 2 at a constriction location thereof. A respective carrier hook 8 is adapted to receive a respective sausage string 9. Accordingly a large number of sausage strings 2 can be transported along the path of movement 10 by means of the carrier hooks 8.

FIGS. 2 through 5 show the path of movement 10 of the carrier hooks 8 of the transport device 6 which is mounted on a multiplicity of supports 12 which are part of a machine frame structure. A spreading device 14 is arranged at the supports 12 of the transport device 6. The spreading device 14 is mounted to and supported on the machine frame structure and is thus arranged stationarily. It can be positioned at different locations on the machine frame structure and can optionally be adjustable, in operation however the spreading device 14 is substantially stationary and immobile while the sausage string 2 is moved relative to the spreading device 14.

The spreading device 14 has a plurality of spreading elements 6 which at least partially come into contact with the sausages 4 of the sausage string 2 in operation and co-operate therewith in such a way that the sausages 4 of the string 2 change their position relative to each other and are spread apart. The spreading elements 16 are so arranged that they form a forked element 18 which can be clearly visible in FIG. 1, with a fork shaft 20 and a fork head 22. The forked element 18 is arranged spaced vertically beneath the carrier hooks 8, in particular spaced vertically beneath a hook throat 9 of the carrier hooks 8. The forked element 18 is arranged relative to the transport device 6 in such a way that the sausage strings 2 in passing along the path of movement 10 in the transport direction firstly pass the fork shaft 20, in particular a first spreading element 16a, and subsequently the fork head 22, in particular a second and a third spreading element 16b and 16c. The fork head 22, in particular the second and third spreading elements 16b and 16c, is connected to the fork shaft 20, in particular the first spreading element 16a, by way of a connecting element 24.

The fork head 22 has preferably two spaced bar-shaped spreading elements 16b and 16c. Instead of bar-shaped spreading elements 16 it is also possible to use rod-shaped, plate-shaped or rail-shaped elements for spreading the sausage strings 2. The spreading elements 16b and 16c of the fork head 20 are arranged in mutually spaced relationship in the transverse direction Q in the illustrated embodiment. The transverse direction Q extends orthogonally relative to the transport direction in a horizontal plane. In the embodiment according to the invention shown by way of example the vertical directional component is to remain disregarded for the definition of the transport direction. The spacing in the transverse direction Q of the spreading elements 16 defines a spreading spacing, the spreading spacing being measured starting from the outer edges of the spreading elements 16.

The spreading elements 16b and 16c diverge in a V-shape from the connecting element 24 whereby their spacing in the transverse direction Q, in particular the spreading spacing, continuously increases. In accordance with the invention it is possible to use different configurations of the spreading elements 16b and 16c in order to achieve appropriate spreading of the sausage strings 2 along the path of movement 10 according to the respective configuration involved. For example the spreading elements 16 can have curved, angular or straight portions or a combination thereof. The aim is to achieve a spreading spacing in the transverse direction Q at least portion-wise along the spreading elements 16b and 16c for spreading the sausage strings 2 which are hung on the transport device 6. The spreading spacing is defined by the shape and the configuration of the forked element 18. Accordingly depending on the respective configuration involved, in particular in the illustrated embodiment, the spreading spacing increases in the direction of the fork head 20, starting from a minimum spreading spacing which is defined by the width, in particular in the transverse direction Q, of the fork shaft 20 with a first spreading element 16a.

Figure 3:
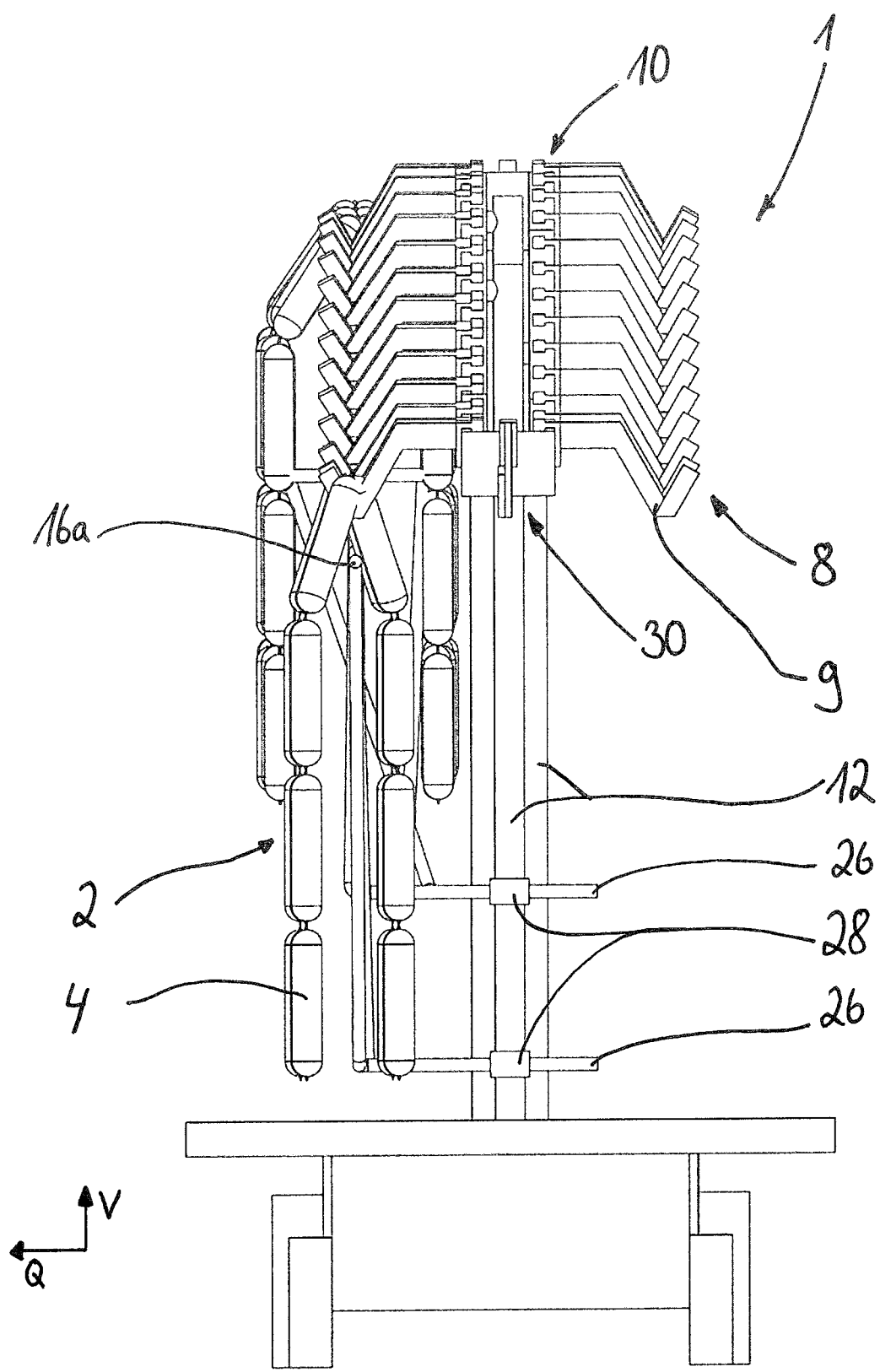
FIG. 3 shows a front view of the suspension apparatus.
Figure 4:
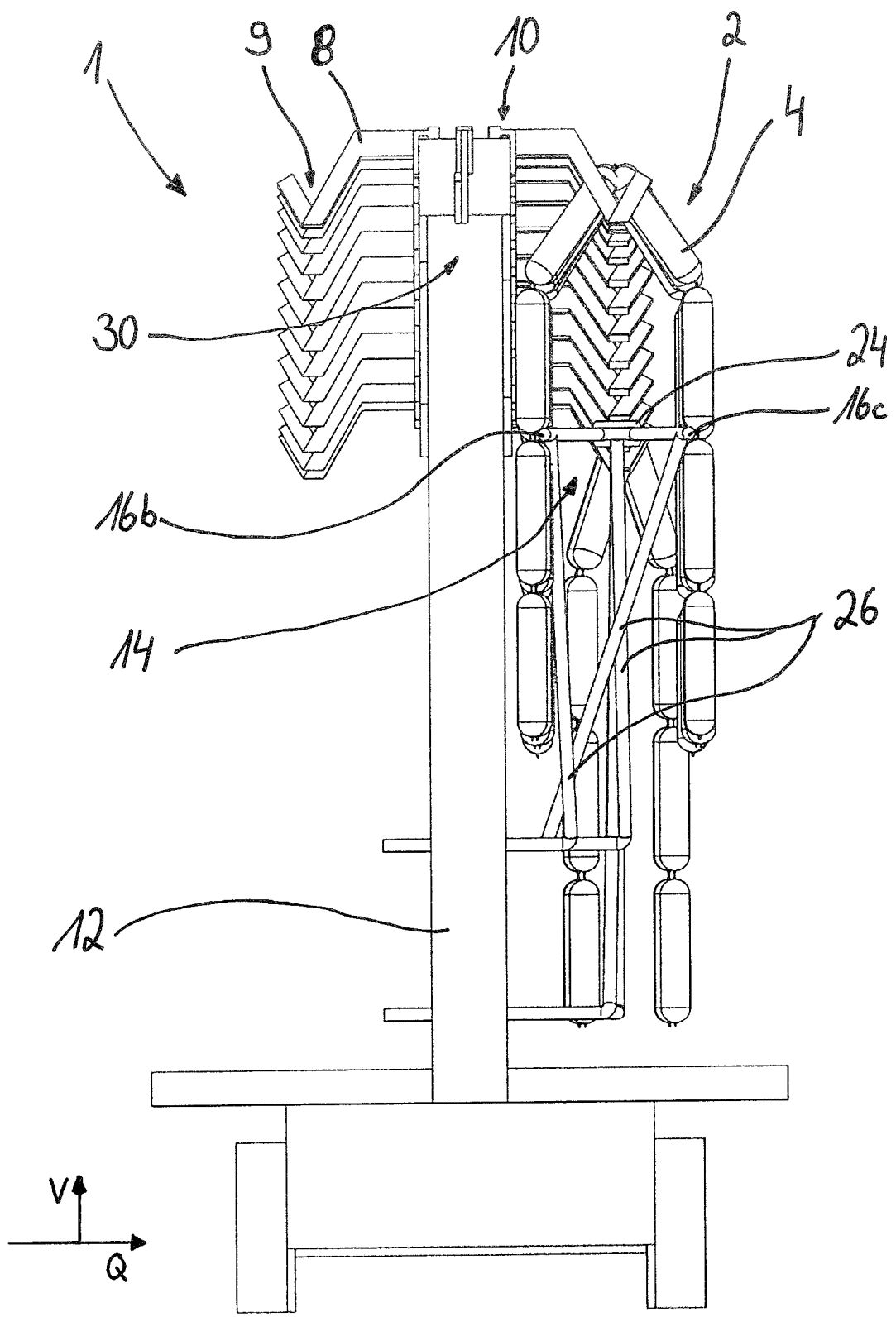
FIG. 4 shows a rear view of the suspension apparatus.
Figure 5:
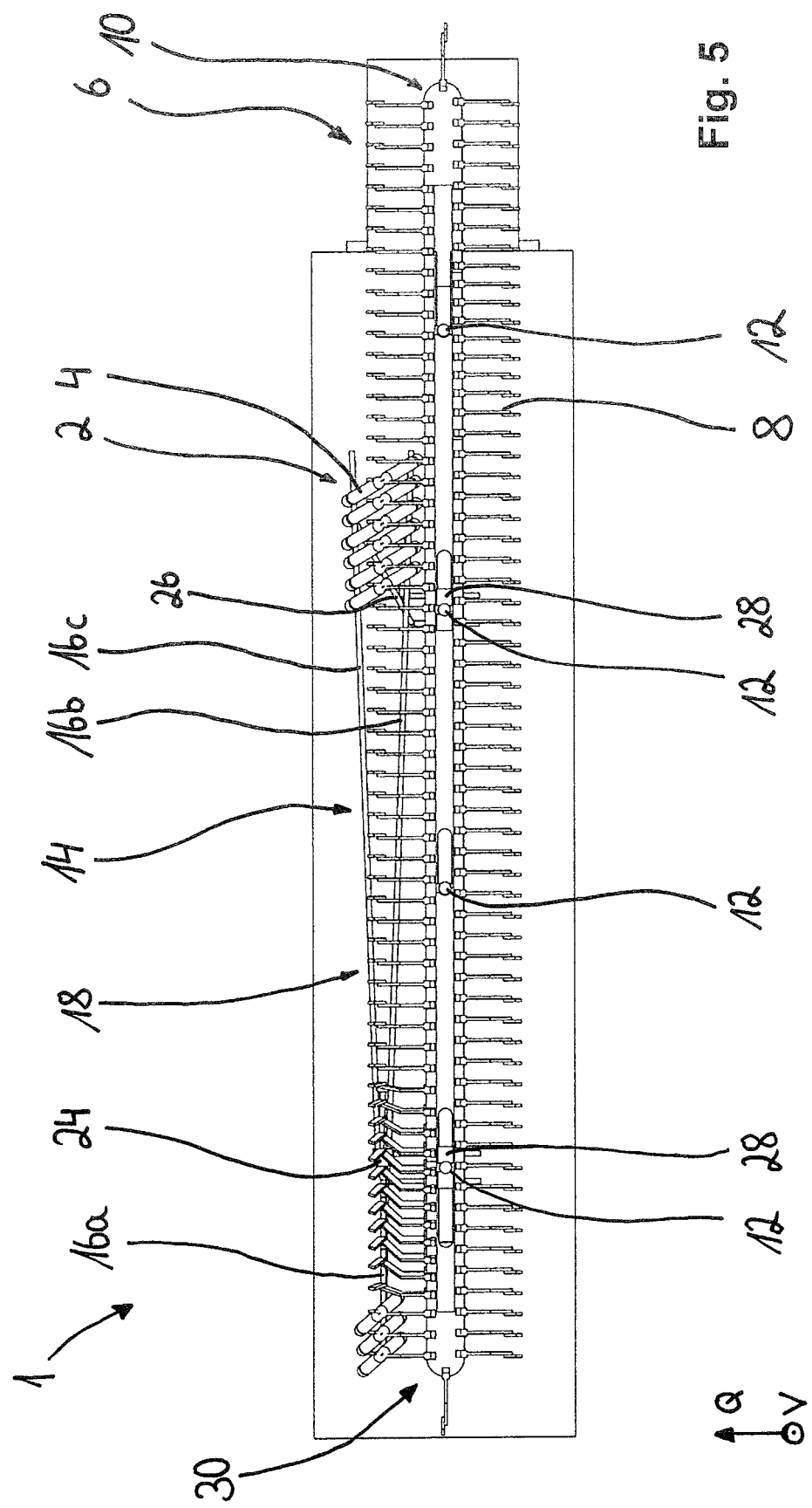
FIG. 5 shows a plan view of the suspension apparatus.

The forked element 18, in particular the spreading elements 16, are coupled by means of support elements 26 to the machine frame structure, in particular in the illustrated embodiment to the supports 12 of the transport device 6, as also shown in FIGS. 3 and 4. The support elements 26 are arranged integrally on the spreading elements 16. The bar-shaped support elements 26 are fixed to the supports 12, preferably by means of a clamping connection 28. The clamping connection 28 can be positioned at different positions on the supports 12 whereby the position of the forked element 18 is adjustable in the vertical direction V, in particular the vertical spacing of the forked element 18 relative to the carrier hooks 8 of the transport device 6. The length of the support elements 26 can be regulated by means of a further clamping connection within the clamping connection 28, wherein the length of the support elements 26 defines the position of the spreading elements 16 in the horizontal plane, in particular the spreading spacing of the spreading elements 16b and 16c. The position of the forked element 18 is additionally adjustable relative to the transport device 6 by rotation of the support elements 26 about a horizontal axis and/or by rotation of the clamping connection 28 about a vertical axis.

The path of movement 10 extends in part along curved portions, preferably along at least one arcuate portion 30. The arcuate portion 30 changes the transport direction in the embodiment according to the invention by way of example through preferably 180°, wherein the change in direction according to the invention can also be greater than or smaller than 180°. The forked element 18 is arranged adjoining the arcuate portion 30. Preferably the first spreading element 16a of the fork shaft 20 is arranged beginning in a region of 180°+10° of the arcuate portion 30. Depending on the respective movement behavior of the sausage strings 2 that region can be individually adapted in accordance with the invention.

Following the arcuate portion 30, in particular when portion-wise passing the forked element 18, the path of movement 10 with the carrier hooks 8 extends from a first height level B1 to a second height level B2. Corresponding to the path of movement 10 of the transport device 6 the forked element 18 extends at least portion-wise in a vertical direction V parallel to the path of movement 10. The forked element 18 correspondingly extends from a first height level G1 to a second height level G2. The vertical spacing of the first height level B1 of the path of movement 10 to the first height level G1 of the forked element 18, in particular the fork shaft 20 with the first spreading element 16a, is smaller than the vertical spacing from the second height level B2 of the path of movement 10 to the second height level G2 of the forked element 18, in particular the fork head 22 with the second and third spreading elements 16b and 16c.

Figure 6:
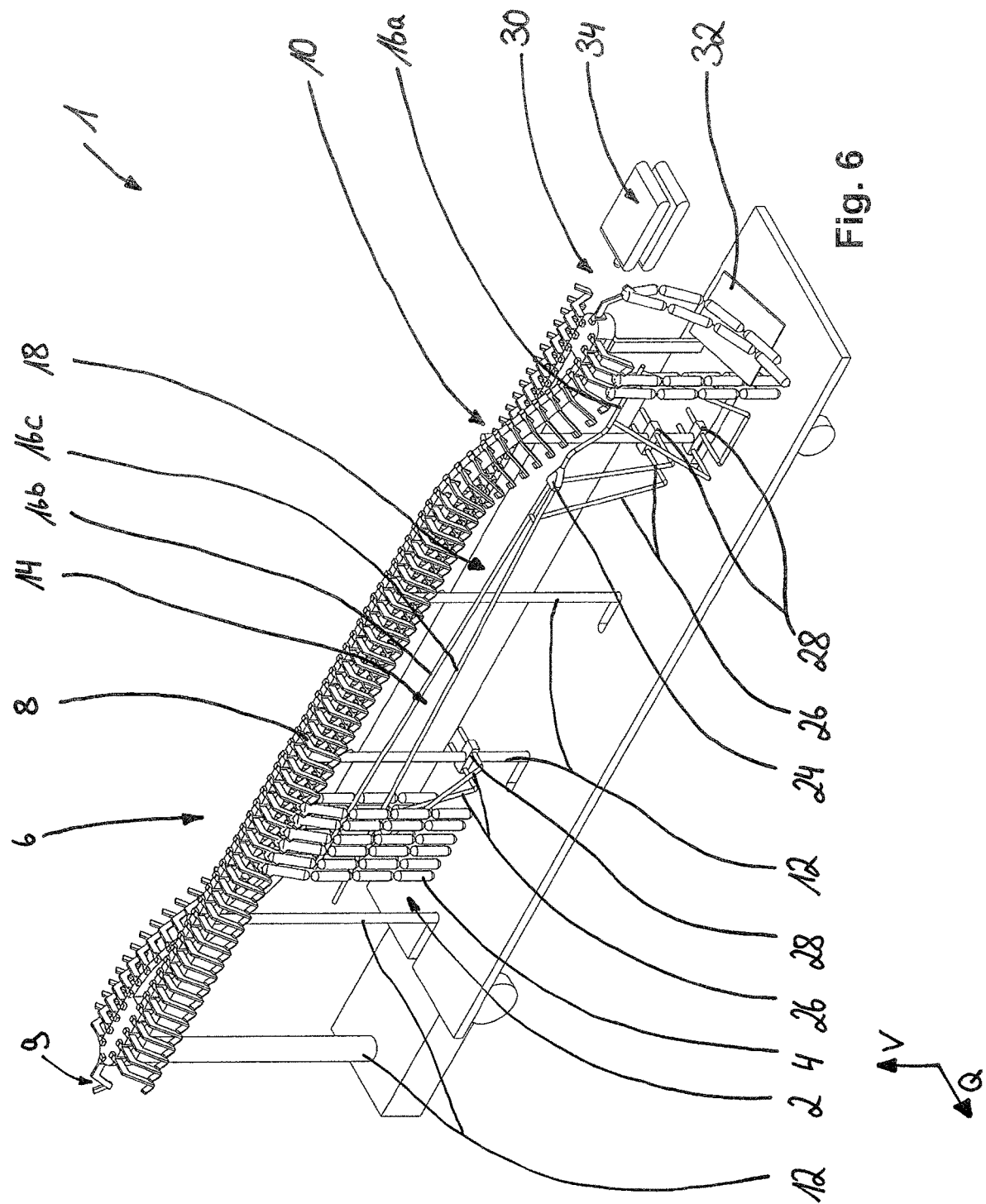
FIG. 6 shows a perspective view of a second embodiment of the suspension apparatus.
Figure 7:
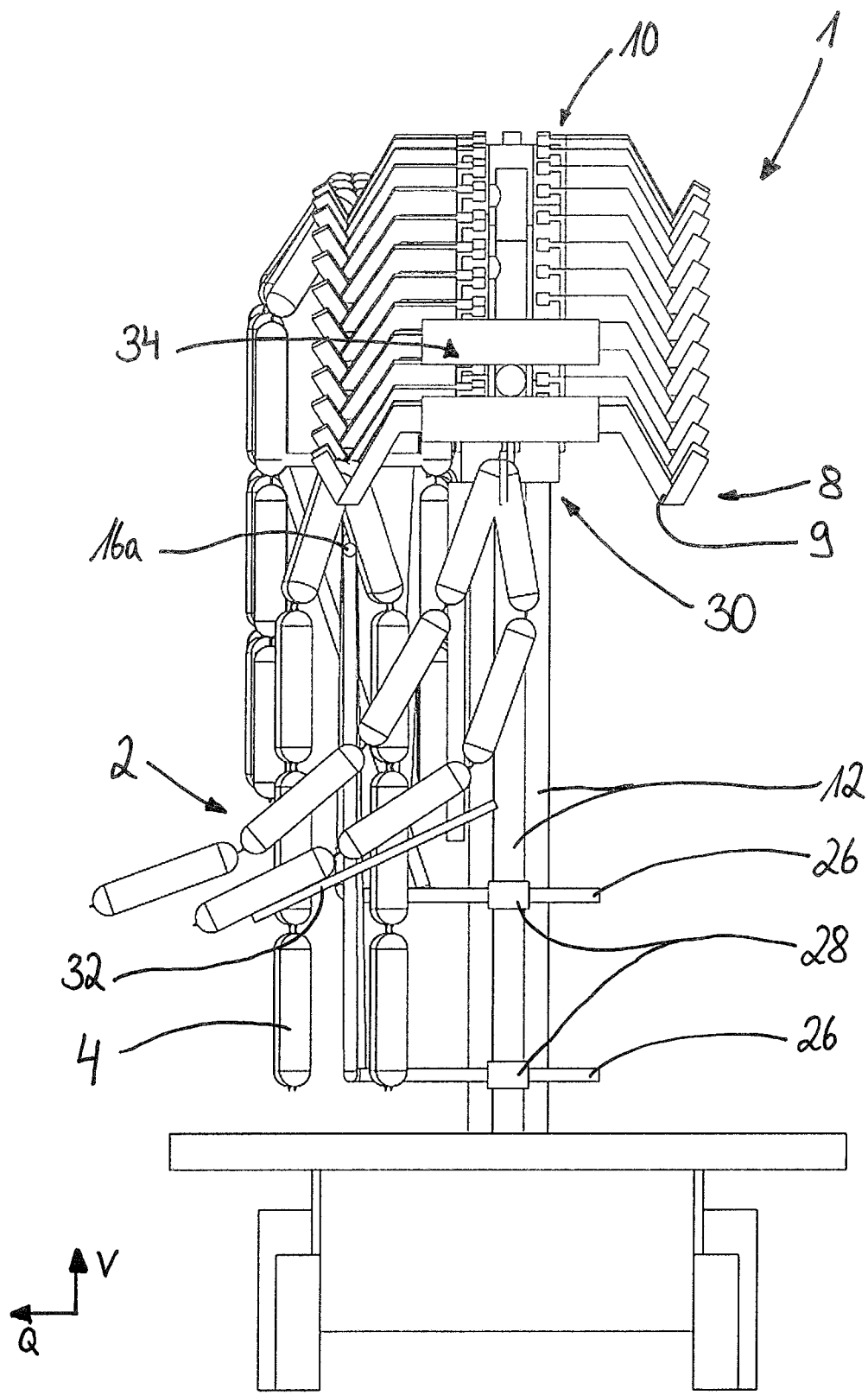
FIG. 7 shows a front view of the suspension apparatus shown in FIG. 6.

FIGS. 6 and 7 show a second embodiment of the suspension apparatus 1. The second embodiment of the suspension apparatus 1 substantially corresponds to the first embodiment and can be viewed as an enlargement thereof. Accordingly reference is directed in full to the features of the first embodiment. The supplemental features in the second embodiment will be described hereinafter.

This concerns on the one hand a catch element 32, the position of which in space is adjustable relative to the suspension apparatus 1. Preferably the catch element 32 is arranged beneath the arcuate portion 30 and/or can be arranged in a falling angle of inclination in the transport direction. The catch element 32 is preferably in the form of a plate. The catch element 32 is adapted at least portion-wise to restrict at least a part of the sausage string 2 upon transport thereof in respect of its freedom of movement.

On the other hand a further supplement to the second embodiment is a transfer device 34. The transfer device 34 is adapted to transfer sausage strings 2 to the suspension apparatus 1, in particular to carrier hooks 8 of the transport device 6. The transfer device 34 is preferably arranged in the region of the arcuate portion 30 of the path of movement 10 in spaced relationship therefrom.

To produce spreading of sausage strings 2 with the suspension apparatus 1 according to the invention a respective sausage string 2 is to be taken up at the hook throat 9 at a constriction location on the sausage string 2 by a respective carrier hook 8. Preferably that constriction location is in the middle region of the sausage string 2 so that the two free ends of the sausage string 2 which hang down from the hook throat 9 are of substantially equal length.

The suspended sausage strings 2 can now be transported along the path of movement 10 by means of the transport device 6. For that purpose the sausage strings 2 are guided along the path of movement 10 on the spreading device 14 preferably arranged beneath the carrier hooks 8. For that purpose the sausage strings 2 firstly pass the first spreading element 16a. The first spreading element 16a which in particular forms a fork shaft 20 is arranged vertically spaced beneath the hook throat 9, preferably parallel to the path of movement 10.

Arranged following the first spreading element 16a are two further spreading elements 16b and 16c which are spaced from each other in the transverse direction and which preferably diverge in a V-shape. Upon transport in the transport direction the sausage strings 2 pass the spreading elements 16b and 16c following the first spreading element 16a which is connected to the spreading elements 16b and 16c by means of a connecting element 24. Consequently the sausage strings 2 are spread apart upon being transported along the spreading elements 16b and 16c.

A smoke stick is subsequently introduced along a guide device between the spreading elements 16b and 16c. The sausage strings 2 can then be ejected for further processing on to the smoke stick and are discharged from the suspension apparatus. The smoke stick and the guide device are not shown in the Figures.

The position of the spreading device 14 can be altered relative to the transport device 6 to achieve an optimized spreading action.

Depending on the length of a sausage string or the length of the free ends of the sausage string 2 the vertical spacing of the spreading device 14 is to be adjusted relative to the carrier hooks 8, in particular the hook throats 9. The vertical spacing is adjustable by means of the clamping connection 28 on the supports 12.

In addition, depending on the sausage geometry, that is to say in particular the sausage thickness and the sausage length, as well as the length of the sausage string, the position in particular of the first spreading element 16a is to be adjusted relative to the path of movement 10 of the transport device 6, and likewise the spreading spacing of the spreading elements 16b and 16c. The spreading spacing can be selected on the one hand by way of the shape of the spreading elements 16. On the other hand the spreading spacing and the position of the spreading elements 16 can be regulated with the clamping connection 28 of the support elements 26.

Guidance of the sausage strings 2 on to the first spreading element 16a can be optimized by an upstream-disposed arcuate portion 30 of the path of movement 10. For that purpose the catch element 32 is to be arranged beneath the arcuate portion 30. The vertical and horizontal position of the catch element 32 is to be so adjusted relative to the carrier hooks 8 that a free end of a sausage string 2, in particular the free end of the string 2, that hangs inwardly within the arcuate portion 30, is in portion-wise contact with the catch element 32, upon passing through the arcuate portion 30. The preferably inwardly hanging free end of the sausage string 2 is accordingly held back from the transport movement by the catch element 32 in portion-wise relationship by frictional forces. The preferably outwardly hanging free end of the sausage string 2 remains free in its movement, that is to say it is preferably not in contact with the catch element 32.

The gap geometry is portion-wise enlarged by that effect within the arcuate portion 30. That effect is enhanced by the centrifugal forces acting on the outwardly hanging free end, within the arcuate portion 30. In other words the gap geometry between the free ends of the sausage string 2 is increased thereby optimizing guidance of the gap on to the first spreading element 16a. The first spreading element 16a is accordingly to be arranged beginning in the end region, in the transport direction, of the arcuate portion 30.

LIST OF REFERENCES 1 suspension apparatus
2 sausage string
4 sausages
6 transport device
8 carrier hook
9 hook throat
10 path of movement
12 support
14 spreading device
16 spreading element (16a, 16b, 16c)
18 forked element
20 fork shaft
22 fork head
24 connecting element
26 support elements
28 clamping connection
30 arcuate portion
32 catch element
34 transfer device
B1 first height level of the path of movement
B2 second height level of the path of movement
G1 first height level of the forked element
G2 second height level of the forked element
Q transverse direction
V vertical direction

What is claimed is:

1. A suspension apparatus for hanging up and transporting a sausage string, the suspension apparatus comprising:
   a guide and drive device;
   a transport device for transporting the sausage string, the transport device having a carrier hook for carrying the sausage string, and the carrier hook being movable along a path of movement by the guide and drive device; and
   a spreading device arranged stationarily relative to the transport device, the spreading device configured to spread the sausage string, and the spreading device having at least one spreading element that is arranged adjacent to the path of movement of the carrier hook and that is configured to act on the sausage string carried by the carrier hook such that the sausage string is spread.

2. The suspension apparatus of claim 1 wherein the guide and drive device for the carrier hook is configured such that the path of movement thereof extends along an arcuate portion, and the spreading device is arranged at least partially in a region of the arcuate portion and adjoins an end of the arcuate portion for guiding the sausage string on to the spreading device.

3. The suspension apparatus of claim 2 further comprising:

a catch element disposed in the region of the arcuate portion and vertically below the transport device, the catch element configured to prevent a sausage or a part of the sausage string from being deflected by centrifugal forces.

4. A suspension apparatus of claim 3 wherein the catch element and the transport device cooperate to set a vertical spacing between the catch element and the transport device, and the vertical spacing is selected such that a first free end of the sausage string in a transport direction along the path of movement of the sausage string is at least portion-wise in frictional or positively locking connection to the catch element, and a second free end of the sausage string is freely movable in the transport direction (T) along the path of movement.

5. The suspension apparatus of claim 1 wherein the spreading device is arranged substantially beneath the path of movement of the carrier hook.

6. The suspension apparatus of claim 1 wherein the at least one spreading element is at least partially curved.

7. The suspension apparatus of claim 1 wherein the spreading device includes a first spreading element, a second spreading element, and a third spreading element, the first spreading element is arranged in a transport direction before the second spreading element and the third spreading element, and the first spreading element is arranged at least portion-wise parallel to the path of movement.

8. The suspension apparatus of claim 1 wherein at least two spreading elements are arranged at least portion-wise in mutually-spaced relationship, and the at least two spreading elements have a spacing that increases at least portion-wise in a transport direction in a transverse direction (Q) extending horizontally and orthogonally to the transport direction.

9. The suspension apparatus of claim 8 wherein the spacing of the spreading elements is at least portion-wise adjustable in the transverse direction (Q).

10. The suspension apparatus of claim 1 wherein the spreading device is spaced at least portion-wise vertically relative to the carrier hook, and a vertical spacing between the spreading device and the carrier hook is variably adjustable in a range of 10 mm through 100 mm.

11. A suspension apparatus of claim 1 wherein the guide and drive device for the carrier hook is configured such that the path of movement thereof at least portion-wise has a difference in height with a first height level (B1) and a second height level (B2).

12. The suspension apparatus of claim 1 wherein at least a part of the spreading device is adjustable in a transport direction and can be fixed in different positions.

13. The suspension apparatus of claim 1 further comprising:
a smoke stick guide device arranged adjacent to the spreading device, the smoke stick guide device cooperating with the spreading device to guide a smoke stick.

14. The suspension apparatus of claim 1 further comprising:
a feed conveyor device coupled to the spreading device, the feed conveyor device configured to automatically feed a smoke stick into the spreading device.

15. A method of spreading a sausage string by a suspension apparatus, the method comprising:
receiving the sausage string by a carrier hook of a transport device;
transporting the sausage string along a path of movement with the carrier hook of the transport device; and
spreading the sausage string on the transport device by a stationarily-arranged spreading device.

16. The method of claim 15 comprising:
setting a vertical spacing of the stationarily-arranged spreading device relative to the transport device.

17. The method of claim 15 wherein the stationarily-arranged spreading device further includes a plurality of spreading elements, and further comprising:
setting a horizontal spacing of at least two of the spreading elements; and
adjusting one of the spreading elements adjoining an end of an arcuate portion of the path of movement.

18. The method of claim 17 wherein the suspension apparatus further has a catch element, and further comprising:
positioning the catch element beneath the transport device in a region of the arcuate portion; and
setting a vertical spacing of the catch element relative to the transport device corresponding to a vertical length of the sausage string,
wherein the spacing is so selected such that a first free end of the sausage string in a transport direction along the path of movement at least portion-wise involves a connection to the catch element, and a second free end of the sausage string is freely movable in the transport direction (T) along the path of movement.

19. The method of claim 15 wherein the suspension apparatus further has a smoke stick and a guide device for guiding the smoke stick, the guide device being arranged adjacent to the stationarily-arranged spreading device, and further comprising:
introducing the smoke stick between the sausage string beneath the carrier hook of the transport device;
ejecting the sausage string from the carrier hook on to the smoke stick; and
exiting the smoke stick from the transport device.

20. The suspension apparatus of claim 1 wherein the at least one spreading element of the spreading device is configured to spread the sausage string by utilizing movement of the sausage chain.

* * * * *

UNITED STATES PATENT AND TRADEMARK OFFICE
CERTIFICATE OF CORRECTION

PATENT NO. : 11,344,035 B2
APPLICATION NO. : 17/021515
DATED : May 31, 2022
INVENTOR(S) : Kohler et al.

It is certified that error appears in the above-identified patent and that said Letters Patent is hereby corrected as shown below:

On the Title Page

Item (72) Inventors:
City for the second Inventor, Klaus Hiller, reads "Dorverden"

Should read:
--Dörverden--

Signed and Sealed this
Second Day of August, 2022

Katherine Kelly Vidal
Director of the United States Patent and Trademark Office